United States Patent [19]

Herzig et al.

[11] Patent Number: 4,857,608

[45] Date of Patent: Aug. 15, 1989

[54] PROCESS FOR PREPARING WEATHER-RESISTANT COATINGS

[75] Inventors: Christian Herzig, Taching; Bernward Deubzer; Volker Frey, both of Burghausen, all of Fed. Rep. of Germany; Esterbauer Josef, Hochburg, Austria

[73] Assignee: Wacker-Chemie GmbH, Munich, Fed. Rep. of Germany

[21] Appl. No.: 166,950

[22] Filed: Mar. 11, 1988

[30] Foreign Application Priority Data

Mar. 19, 1987 [DE] Fed. Rep. of Germany ....... 3709045

[51] Int. Cl.$^4$ .......................... B05D 3/02; B32B 9/04; C08F 283/00; C08G 65/32

[52] U.S. Cl. .................................... 525/476; 427/386; 427/387; 428/418; 428/450; 525/523

[58] Field of Search ................ 427/386, 387; 525/476, 525/523; 428/413, 418, 447, 450

[56] References Cited

U.S. PATENT DOCUMENTS

| | | | |
|---|---|---|---|
| 4,413,104 | 11/1983 | Deubzer et al. | 525/474 X |
| 4,436,787 | 3/1984 | Mikami et al. | 525/476 X |
| 4,474,930 | 10/1984 | Mikami et al. | 525/523 X |
| 4,614,766 | 9/1986 | Schimmel et al. | 525/476 X |
| 4,657,986 | 4/1987 | Isayama et al. | 525/476 X |

*Primary Examiner*—Michael Lusignan

[57] ABSTRACT

Substrates which are exposed to weathering are coated with paints containing an epoxy resin and a silicon compound containing basic nitrogen which is bonded to the silicon via a carbon and which has at least one hydrogen atom bonded directly to the nitrogen atom.

5 Claims, No Drawings

PROCESS FOR PREPARING WEATHER-RESISTANT COATINGS

The present invention relates to weather-resistant coatings and more particularly to a process for preparing coatings which may be exposed to weathering.

BACKGROUND OF THE INVENTION

Crosslinking of an epoxy resin at room temperature using a silicon compound containing basic nitrogen which is bonded to the silicon via a carbon and which has at least one hydrogen bonded directly to it is described, for example, in U.S. Pat. No. 4,413,104 to Deubzer et al (cf. Example 1). It has now been found that coatings formed from an epoxy resin crosslinked in this manner, exhibit a particularly low degree of chalking when exposed to weathering.

It is an object of the present invention to provide weather-resistant coatings. Another object of the present invention is to provide a process for preparing weather-resistant coatings. Still another object of the present invention is to provide a paint for coating a substrate which is substantially free of chalking. A further object of the present invention is to provide a process for coating a substrate in which the coated substrate is substantially free of chalking.

SUMMARY OF THE INVENTION

The foregoing objects and others which will become apparent from the following description are accomplished in accordance with this invention, generally speaking, by providing a process for preparing coatings which are resistant to weathering, which comprises applying a paint to a substrate to form a coating containing as the major components, an epoxy resin and a silicon compound containing basic nitrogen which is bonded to the silicon via a carbon and which has at least one hydrogen atom bonded directly to it.

DESCRIPTION OF THE INVENTION

The paints used in the process of this invention can contain any epoxy resin which is suitable for use as a major component of paints. These epoxy resins have already been described, for example, in Kirk-Othmer, Encyclopedia of Chemical Technology, 3rd edition, Volume 9, pages 267 to 290, which is incorporated herein by reference. It is especially preferred that the paints used in accordance with this invention contain as at least one part of the epoxy resin at least one product obtained from the reaction of 2,2-bis-(4-hydroxyphenyl)propane (bisphenol A) with epichlorohydrin, i.e., a compound of the formula

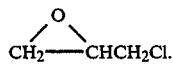

Other examples of preferred epoxy resins which may be used in the paints of this invention are triglycidyl isocyanurate and products obtained from the reaction of bis-(4-hydroxyphenyl)methane (bisphenol F) with epichlorohydrin.

The epoxy resins can be modified by reacting them with organosilicon compounds, such as a silane of the formula

The preferred silicon compounds containing basic nitrogen which is bonded to silicon via a carbon and which has at least one hydrogen atom directly bonded to it, are organopolysiloxanes consisting of units of the formula

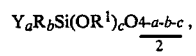

where R represents the same or different monovalent hydrocarbon radicals having from 1 to 8 carbon atom(s) per radical, $R^1$ represents the same or different alkyl groups having from 1 to 4 carbon atom(s) per radical, Y represents the same or different monovalent SiC-bonded organic radicals containing basic nitrogen which has at least one hydrogen atom directly bonded to it, a is 0 or 1, preferably an average of from 0.02 to 1.0, b is 0, 1, 2 or 3, preferably an average of from 0.0 to 2.0, and c is 0, 1, 2 or 3, preferably an average of from 0.0 to 2.0.

In the above formulas, a is preferably from 0.1 to 0.4, b is preferably from 0.5 to 1.5 and c is preferably from 0.1 to 1.0.

However, the silicon compounds containing basic nitrogen which is bonded to silicon via a carbon and which has at least one hydrogen atom bonded directly to it, can also be, for example, silanes of the formula $$YR_dSi(OR^1)_{3-d} \qquad (2)$$

where Y, R and $R^1$ are the same as above, and d is 0, 1 or 2; silcarbanes of the formula $$Y(OR^1)_2Si(CH_2)_2Si(OR^1)_2Y, \qquad (3)$$

where Y and $R^1$ are the same as above; or products obtained from the reaction of at least one silicon compound from at least one of the classes of silicon compounds represented by formulas (1), (2) or (3), containing basic nitrogen which is attached to silicon via a carbon and which has at least 1 hydrogen atom bonded directly to it, with hydrocarbon diols having 2 to 15 carbon atoms per molecule, such as diethylene glycol, bisphenol A or bisphenol F, hydrocarbon triols, such as glycerol, or purely organic polymers containing alcoholic hydroxyl groups, such as hydroxypolyesters, hydroxypolyethers, hydroxypolyacrylates or hydroxypolyurethanes.

The above reaction products preferably have an average of at least 1 silicon atom with a basic nitrogen bonded via a carbon, in which at least 1 hydrogen atom is bonded directly to the nitrogen, per 3,000 g of reaction product and more preferably per 1,500 g of reaction product.

Examples of hydrocarbon radicals represented by R are methyl, ethyl, n-propyl, isopropyl, butyl and 2-ethylhexyl radicals; hydrocarbon radicals with aliphatic multiple bonds, such as the vinyl and allyl radicals; cycloaliphatic hydrocarbon radicals, such as the cyclopentyl, cyclohexyl, and the methylcyclohexyl radicals; aromatic hydrocarbon radicals such as the phenyl and xenyl radicals; alkaryl radicals such as the tolyl radicals; and aralkyl radicals, such as the benzyl radical. The hydrocarbon radicals represented by R, which are bonded to silicon atoms to which basic nitrogen is also bonded via a carbon and which has hydrogen bonded directly to it, are preferably free from aliphatic multiple bonds. It is further preferred that at least 50 percent of the number of radicals represented by R be methyl radicals because of their availability.

The above examples of alkyl radicals represented by R having from 1 to 4 carbon atom(s) per radical are also representative of the radicals represented by $R^1$.

The radicals represented by Y are preferably those of the formula $R^2NHR^3—$, where $R^2$ represents hydrogen or the same or different alkyl or cycloalkyl or aminoalkyl radicals having from 1 to 8 carbon atoms per radical, and $R^3$ represents the same or different straight-chain or branched hydrocarbon radicals which are free of aliphatic multiple bonds and have one carbon atom or 3 or 4 carbon atoms per radical, and in particular a radical of the formula $—(CH_2)_3—$.

The examples for the alkyl and cycloalkyl radicals represented by R also apply to the alkyl and cycloalkyl radicals represented by $R^2$.

Examples of aminoalkyl radicals represented by $R^2$ are those of the formula $H_2N(CH_2)_3—$, $H_2N(CH_2)_2NH(CH_2)_2—$, $H_2N(CH_2)_2—$, $(H_3C)_2NH(CH_2)_2—$, $H_2N(CH_2)_4—$, $H(NHCH_2CH_2)_3—$ and $C_4H_9NH(CH_2)_2NH(CH_2)_2—$.

The paints used in accordance with this invention can contain a silicon compound containing basic nitrogen which is bonded to the silicon via a carbon and which has at least 1 hydrogen atom bonded directly to it, or a mixture consisting of at least two different types of such silicon compounds.

The paints used in accordance with this invention preferably contain a silicon compound having basic nitrogen bonded to silicon via a carbon and which has at least 1 hydrogen atom bonded directly to it, in an amount of from 5 to 70 percent by weight, and more preferably from 25 to 40 percent by weight, based on the total weight of all resins other than those containing basic nitrogen which is bonded to silicon via a carbon and which has at least 1 hydrogen atom bonded to it.

It is preferred that from 0.8 to 1.5, and more preferably from 1.0 to 1.3, hydrogen atoms are bonded directly to nitrogen per epoxy group.

The paints used in accordance with this invention can contain, in addition to the epoxy resin and the silicon compound containing basic nitrogen which is bonded to silicon via a carbon and which has at least 1 hydrogen atom bonded directly to it, components that are generally present in paints containing epoxy resins. Examples of such components are commercial crosslinking agents for epoxy resins, such as amino or amino-amide compounds which are free from silicon atoms, for example, melamine resins, solvents such as methyl ethyl ketone, methyl isobutyl ketone, ethylene glycol, mixtures of xylene isomers or mixtures of at least two such solvents, pigments such as titanium dioxide, leveling agents and extenders.

Prior to the final application of paints used in accordance with this invention, the epoxy resin is stored separately from compounds containing basic nitrogen which has at least 1 hydrogen atom directly bonded to it. For the final application, the epoxy resin and the silicon compound containing basic nitrogen which has at least 1 hydrogen atom bonded directly to it, are mixed and the resultant mixture is applied to the substrate to be coated. This application can be carried out in any suitable manner for the application of liquid paints onto substrates to be coated, for example, by brushing, rolling, spraying or stippling. After the two components are mixed, the resultant mixture is applied to the substrates to be coated, and thereafter the composition is crosslinked at room temperature within a few days. Crosslinking can be accelerated by heating to temperatures of from 40° to 110° C. The paints used according to this invention which contain silicon compounds that have a nitrogen bonded to silicon via a carbon and which has at least 1 hydrogen atom bonded directly to it, crosslink more rapidly than those which contain epoxy resins and amino-amides as crosslinking agents.

The coatings produced by the process of this invention exhibit a particularly low degree of chalking, i.e., a particularly small amount and/or a particularly slow forming deposit is formed on the surface under the influence of light and atmospheric conditions which is removable by wiping. The deposit is caused by weathering of the crosslinked epoxy resins, but they are also particularly hard and resistant to chemicals.

Any substrate can be coated which is to be protected from the effects of weathering or is to be painted for other reasons with a coating which is resistant to weathering. Such substrates are, for example, the exterior of buildings, roofs of structures made from wood, metals such as steel, aluminum or copper, or concrete, or concrete or bituminous areas which must be painted with a weather-resistant coating, such as road surface markings, exterior surfaces of vehicles, aircraft or ships, and offshore drilling installations.

In the following examples, all parts and percentages are by weight unless otherwise specified.

EXAMPLE (a) About 368 parts of a 75 percent solution of an organopolysiloxane containing 3 percent hydroxyl groups which are bonded to silicon in a ratio of 1.46:1 of SiC-bonded organic radicals to silicon atoms, in which 37 percent of the number of these radicals are phenyl radicals and the remaining SiC-bonded organic radicals are methyl radicals, in a commercial mixture of xylene isomers are mixed with 180 parts of beta-aminoethyl-gamma-aminopropyltrimethoxysilane in 32 parts of the commercial mixture of xylene isomers. The resultant mixture is heated to 110° C. for 3 hours. The components of the reaction mixture which boil at 150° C. and at 1 hPa (abs.) are then distilled off under these conditions. The residue is mixed with a sufficient amount of the commercial mixture of xylene isomers to form a 75 percent solution. This solution is a faintly yellowish liquid having a viscosity of about 50 mm² s⁻¹ at 250° C. The organopolysiloxane in this solution has the formula

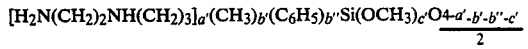

wherein a' is an average of 0.22, b' is an average of 0.71, b" is an average of 0.42 and c' is an average of 0.55.

(b) A mixture containing 48.5 parts of a commercially available product obtained from the reaction of 2,2-bis-(4-hydroxyphenyl)propane with epichlorohydrin having a molecular weight of about 900; 15.0 parts of methyl ethyl ketone; 15.0 parts of methyl isobutyl ketone; 7.0 parts of ethylene glycol monoethyl ether; 30.0 parts of a commercial mixture of xylene isomers; 4.5 parts of a commercial 10 percent solution of a melamine resin in a mixture of xylene isomers; and 72.3 parts of titanium dioxide is mixed with 31.1 parts of the organopolysiloxane solution prepared in (a) above.

(c)
(1) Viscosity increase at 25° C. of a sample of the paint prepared in accordance with (b) above,

| Time elapsed since preparation of the mixture in hours: | 2 | 6 | 24 | 48 |
|---|---|---|---|---|
| Efflux time from DIN 4 cup in seconds | 15.8 | 16.6 | 28.2 | gel formation |

(2) A sample of the paint is applied to a steel panel, one hour after being prepared, at a thickness of 100 micrometers. The coated steel panel is stored at 25° C.

| Time elapsed since application in days: | 1 | 2 | 3 | 4 |
|---|---|---|---|---|
| Double rubbing test⁽⁺⁾ | 22 | 59 | 170 | more than 200 |
| Pencil hardness test | 2H | 4H | 6H | 7H |

⁽⁺⁾number of double rubbing passes required to remove the coating, using a rag saturated with methyl ethyl ketone (MEK).

(3) The procedure described in (2) above is repeated, except that the painted steel panel is stored at 60° C. instead of at 25° C.

| Time elapsed since application in hours: | 1 | 2 | 3 | 5 |
|---|---|---|---|---|
| Double rubbing test⁽⁺⁾ | 22 | 65 | 140 | more than 200 |
| Pencil hardness test | 6H | 8H | 8H | 8H |

⁽⁺⁾number of double rubbing passes required to remove the coating, using a rag saturated with methyl ethyl ketone (MEK).

Mechanical properties of the film prepared in (2) above after 5 hours at 60° C.:
impact hardness: 437 g.m
Erichsen indentation (DIN 53156/May 1971): 6.5 mm
mandrel bending test (DIN 53152/May 1971): 2 mm (d) Steel panels coated with the paint prepared in (c) (3) above, are each illuminated in a cycling test for periods of 8 hours by an ultraviolet mercury lamp with an ultraviolet light range of 280 to 360 nanometers, while steam is allowed to condense on each of them for periods of 4 hours.

| Gloss after acclerated weathering in hours: | 0 | 24 | 72 | 165 |
|---|---|---|---|---|
| Degree of reflection: | 83 | 76 | 69 | 7 |

Chalking after 500 hours illumination by the ultraviolet lamp: 0–1. (The lower the value, the lower the degree of chalking).

COMPARISION EXAMPLE V₁

(a) A mixture containing 48.5 parts of commercial epoxy resin; 10.0 parts of methyl ethyl ketone, 10.0 parts of methyl isobutyl ketone; 5.0 parts of ethylene glycol monoethyl ether; 22.0 parts of a commercial mixture of xylene isomers; 4.5 parts of a commercial 10 percent solution of a melamine resin in a mixture of xylene isomers; and 51.5 parts of titanium dioxide is mixed with 2.4 parts of diethylenetriamine in 5.0 parts of a commercial mixture of xylene isomers. The resultant mixture has the same ratio of pigment:polymer, the same content of substances other than the solvent and the same ratio of epoxy:NH groups as the mixture prepared in Example (1)(b) above.

(b) The procedures described in Example 1, (c)(2) and (3) are repeated, except that the mixture whose preparation was described in Comparison Example V₁ (a) above is substituted for the mixture whose preparation was described in Example (1)(b) above.

(b) The procedures described in Example 1, (c)(2) and (3) are repeated, except that the mixture whose preparation was described in Example V₁(a) above, is substituted for the mixture whose preparation was described in Example (1)(b) above.

| Time at 25° C. elapsed since application in days: | 2 | 3 | 7 |
|---|---|---|---|
| Double rubbing test⁽⁺⁾ | 6 | 11 | 40 |
| Pencil hardness test | HB | F | H |

⁽⁺⁾number of double rubbing passes required to remove the coating, using a rag saturated with MEK

| Time at 60° C. elapsed since application in hours: | 1 | 2 | 3 | 5 |
|---|---|---|---|---|
| Double rubbing test⁽⁺⁾ | 15 | 50 | 95 | 200 |
| Pencil hardness test | 6H | 8H | 8H | 8H |

⁽⁺⁾number of double rubbing passes required to remove the coating, using a rag saturated with MEK

COMPARISON EXAMPLE V₂

(a) The procedure described in Comparison Example V₁ (a) is repeated, except that 75.7 parts of titanium dioxide are used instead of 51.5 parts of titanium dioxide and 26.7 parts of a commercial amine-amide crosslinking agent are used in 20 parts of a commercial xylene isomer mixture instead of 2.4 parts of diethylenetriamine in 5.0 parts of xylene isomer mixture. The resultant mixture has the same pigment:polymer ratio and the same content of substances other than the solvent as the mixture whose preparation was described in Example (1)(b) above.

(b) Viscosity increase at 25° C. of a sample of the paint whose preparation is described in Comparison Example V₂ (a) above:

| Time elapsed since preparation of the mixture in hours | 1 | 6 | 21 | 45 | 53 |
|---|---|---|---|---|---|
| (++) | | 39.0 | 48.5 | 100.0 | 765.8 gel formation |

(++) efflux time from DIN 4 cup in seconds (c) The procedure described in Example (1) (c)(3) above is repeated, except that the mixture whose preparation was described in Comparison Example $V_2$ (a) above, is substituted for the mixture whose preparation was described in Example (1) (b) above.

| Time elapsed since application in hours | 1 | 4 | 5 | 7 | 8 |
|---|---|---|---|---|---|
| Double rubbing test(+) | 7 | 80 | 150 | 185 | more than 200 |

(+)number of double rubbing passes required to remove the coating, using a rag saturated with MEK Mechanical properties of the film prepared according to Comparison Example $V_2$ (c) above after 8 hours at 60° C.:

impact hardness: 276 g.m mandrel bending test (DIN 53152/May 1971: 3 mm

The tests described in Example (1)(d) above are repeated, except that the steel panels are coated with a paint prepared in accordance with Comparison Example $V_2$(a) above instead of the paint prepared in Example (1)(b).

| Gloss after accelerated weathering in hours: | 0 | 24 | 72 | 165 |
|---|---|---|---|---|
| Degree of reflection: | 93 | 83 | 33 | 3 |

Chalking after 500 hours illumination by the ultraviolet mercury lamp: 5 (5 is the worst possible value).

What is claimed is:

1. A process for preparing weather-resistant coatings which comprises applying a paint to a substrate to form a coating thereon containing as the major components an epoxy resin and a silicon compound containing basic nitrogen which is bonded to the silicon via a carbon and which has at least one hydrogen atom bonded directed to the nitrogen, where said silicon compound is selected from the group consisting of organopolysiloxanes consisting of units of the formula

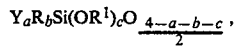

$$Y_aR_bSi(OR^1)_cO_{\frac{4-a-b-c}{2}},$$

where R is a monovalent hydrocarbon radical having from 1 to 8 carbon atoms, $R^1$ is an alkyl group having from 1 to 4 carbon atoms, Y is a monovalent SiC-bonded organic radical containing basic nitrogen, which is bonded to silicon via carbon and has at least one hydrogen atom bonded to the nitrogen, a is 0 or 1, with an average of from 0.02 to 1.0, b is 0, 1, 2, or 3, with an average of from 0.0 to 2.0, and c is 0, 1, 2, or 3, with an average of from 0.0 to 2.0 and silcarbanes of the formula $$Y(OR^1)_2Si(CH_2)_2Si(OR^1)_2Y$$

where $R^1$ is an alkyl group having from 1 to 4 carbon atoms and Y is a monovalent SiC-bonded organic radical containing basic nitrogen which is bonded to silicon via carbon and has at least one hydrogen bonded to the nitrogen.

2. The process of claim 1, wherein the paint contains as part of the epoxy resin a product obtained from the reaction of 2,2-bis-(4-hydroxyphenyl)propane with epichlorohydrin.

3. The process of claim 1, wherein the silicon compound is an organopolysiloxane consisting of units of the formula

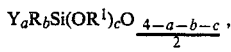

$$Y_aR_bSi(OR^1)_cO_{\frac{4-a-b-c}{2}},$$

where R is a monovalent hydrocarbon radical having from 1 to 8 carbon atoms, $R^1$ is an alkyl group having from 1 to 4 carbon atoms, Y is a monovalent SiC-bonded organic radical containing basic nitrogen, which is bonded to silicon via carbon and has at least one hydrogen atom bonded to the nitrogen, a is 0 or 1, with an average of from 0.02 to 1.0, b is 0, 1, 2 or 3, with an average of from 0.0 to 2.0, and c is 0, 1, 2, or 3, with an average of from 0.0 to 2.0.

4. The process of claim 1, wherein the silicon compound is a silcarbane of the formula $$Y(OR^1)_2Si(CH_2)_2Si(OR^1)_2Y$$

where $R^1$ is an alkyl group having from 1 to 4 carbon atoms and Y is a monovalent SiC-bonded organic radical containing basic nitrogen which is bonded to silicon vis carbon and has at least one hydrogen bonded to the nitrogen.

5. A coated substrate obtained from the process of claims 1, 2, 3 or 4.

* * * * *